(No Model.)

A. F. TINNERHOLM & C. F. PETERSON.
PROCESS OF MANUFACTURING INSULATING MATERIAL.

No. 522,242. Patented July 3, 1894.

WITNESSES:
A. F. Macdonald
S. J. Livermore

INVENTORS.
August F. Tinnerholm
Charles F. Peterson
by Bentley & Blodgett,
attys.

UNITED STATES PATENT OFFICE.

AUGUST F. TINNERHOLM AND CHARLES F. PETERSON, OF SCHENECTADY, NEW YORK, ASSIGNORS TO THE GENERAL ELECTRIC COMPANY, OF BOSTON, MASSACHUSETTS.

PROCESS OF MANUFACTURING INSULATING MATERIAL.

SPECIFICATION forming part of Letters Patent No. 522,242, dated July 3, 1894.

Application filed July 31, 1893. Serial No. 481,927. (No specimens.)

*To all whom it may concern:*

Be it known that we, AUGUST F. TINNERHOLM and CHARLES F. PETERSON, citizens of the United States, residing at Schenectady, in the county of Schenectady and State of New York, have invented a certain new and useful Process for the Manufacture of Insulating Material, of which the following is a specification.

Our invention relates to a new and improved process for manufacturing sheets of insulating material from pieces or scales of mica of the character known in the market as "scrap-mica." Various ways of building up sheets or plates of "made-mica," so called, have been proposed and carried out commercially. For example, it has long been customary to paste together small pieces or scales of mica in any suitable manner in layers, until a plate or sheet of the desired thickness is made up, and it is to an improvement in this method that our invention especially relates. Heretofore the process has been somewhat as follows: The scales are put together as above described and caused to adhere to each other by means of shellac or other gum varnish, the said shellac or varnish being made by dissolving the gum or resin in alcohol. After the sheet or plate of mica is thus built up it is heated or baked until the alcohol is entirely driven off. This requires considerable time and it is found moreover, that nearly three-fourths of the cost of the varnish is in the alcohol employed as a solvent, the said alcohol being thus entirely wasted. We have discovered that this loss can be entirely obviated and much valuable time saved by using powdered gum or resin in a dry state instead of a varnish, preferably in amount less than ten per cent. of the finished plate, thereby rendering it unnecessary to use a solvent and afterward evaporate the solvent as in the process above described. It is in this discovery that our invention chiefly consists.

We have found moreover that a better sheet or plate of insulating material is obtained by carrying out our process, for in the other process above described, it often happens that some alcohol remains even after the baking or heating has apparently been continued for a sufficient length of time, and the presence of any such alcohol in the plate or sheet often causes trouble when such a sheet is used for insulation.

Figure 1:
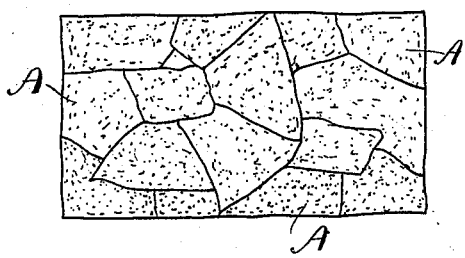
Figure 2:
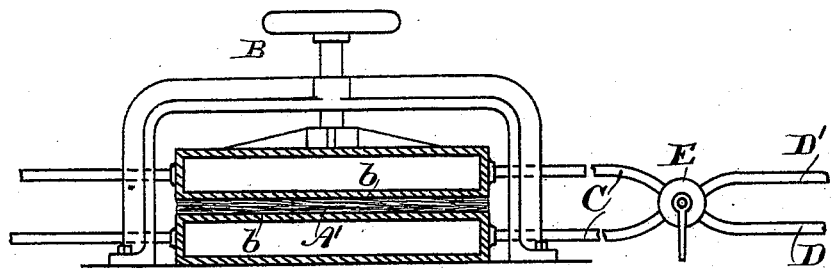

In the accompanying drawings, Figure 1 is a top view of a sheet of mica in the process of formation. Fig. 2 is a front elevation of a press used in the construction of such a sheet.

In carrying out our invention, we take the scales A and place them in a box together with powdered gum or resin and shake the contents of the box well together until the scales are all covered with the fine powder. It is obvious, however, that the powder may be applied in any other manner which may be found expedient; such for example, as by applying it with a brush or by means of a suitable sprinkler. The scales thus powdered are then placed side by side, as shown in Fig. 1, upon a steam heating table, or other suitably heated flat surface and arranged in the desired shape, the outer scales being trimmed so as to make the edges of the layer approximately straight, while the remaining scales are arranged more or less indiscriminately, as shown in the drawings. Other scales are then placed in the same manner upon the layer thus formed, and the process continued until the desired thickness is obtained. The sheet, in its present state is called a "green" sheet. This green sheet A', is then taken to the press B, Fig. 2, and squeezed between the surfaces $b$, the object of the squeezing being to make each scale adhere closely to the scale next adjacent. The said surfaces $b$ are heated during the first part of the operation by steam entering the pipes C from the pipe D through a suitable cock E. After the said sheet has been subjected to heat for a sufficient length of time, the cock E is turned, closing the pipe D and shutting off the steam, and by the same movement opening the pipe D' which is connected to a source of cold fluid, preferably cold water, which is thus permitted to pass through the pipe C and cool the press. During this operation the pressure is still maintained. It is obvious that any kind of a press may be used for the process and any suitable device for alternately heating and cooling the same may be employed, the press shown in the drawings being simply a conventional form which serves to illustrate the process. After the sheet of mica is thoroughly cooled it is taken from the press and is then completed and ready to be used as insulating material. It is found that sheets of made mica produced by this process are as hard and strong as solid mica, and upon being struck emit a metallic ring.

If desired the said green sheets can be built up without recourse to the steam table by placing the powdered scales upon a flat surface, preferably slate, and arranging them side by side to form the desired shape. In order to facilitate the building up of the scales in this manner, it has been found expedient to dip one edge of each scale in a paste or varnish, just sufficient paste being used to cause one scale to adhere temporarily to its neighbor. In practice a little paste is poured out on the slate and as the scale is picked up one edge of it is drawn along the surface so as to pass through a thin layer of said paste. When the sheet is built up to the desired thickness it is placed upon the steam table and allowed to heat through so as to cause the scales to adhere to one another with sufficient firmness to admit of handling the plate for the purpose of placing it in the press, in order that the same operation as above described may be carried out.

What we claim as new, and desire to secure by Letters Patent, is—

1. The herein described process of building up mica plates, which consists in forming superposed layers of mica scales covered with finely powdered gum or resin, submitting the layers thus assembled to heat and to pressure applied at right angles to their plane, and maintaining the pressure until the material is cooled, as set forth.

2. The herein described process of building up mica plates, which consists in laying mica scales in parallel planes, dusting on the scales and between their surfaces a powdered gum or resin, adding successive layers similarly treated, and submitting the combined layers thus assembled to heat and pressure, as set forth.

3. As an article of manufacture, a sheet composed of scales or pieces of mica, and made up by adding less than ten per cent. of powdered gum or resin between the scales.

In witness whereof we hereunto set our hands this 26th day of July, 1893.

AUGUST F. TINNERHOLM.
CHAS. F. PETERSON.

Witnesses:
FRED BATHURST,
JOHN MORTON.